(12) United States Patent
Saeks et al.

(10) Patent No.: US 6,247,671 B1
(45) Date of Patent: Jun. 19, 2001

(54) ION DOPING APPARATUS AND METHOD FOR AERODYNAMIC FLOW CONTROL

(75) Inventors: Richard E Saeks, Chattanooga, TN (US); Erich E Kunhardt, HoBoken, NJ (US); Lindley A Carlton; Robert M Pap, both of Chattanooga, TN (US)

(73) Assignee: Accurate Automation Corporation, Chattanooga, TN (US)

( * ) Notice: Subject to any disclaimer, the term of this patent is extended or adjusted under 35 U.S.C. 154(b) by 0 days.

(21) Appl. No.: 09/158,502

(22) Filed: Sep. 23, 1998

(51) Int. Cl.[7] .................................................. B64C 1/38
(52) U.S. Cl. ...................................... 244/205; 244/130
(58) Field of Search ............................ 244/205, 130, 244/198

(56) References Cited

U.S. PATENT DOCUMENTS

| | | | |
|---|---|---|---|
| 2,279,586 | * 4/1942 | Bennett | 230/69 |
| 2,946,541 | * 7/1960 | Boyd | 244/42 |
| 3,095,163 | * 6/1963 | Hill | 244/12 |
| 3,325,123 | * 6/1967 | Null | 244/77 |
| 3,713,157 | * 1/1973 | August | 343/18 |
| 4,014,168 | * 3/1977 | Carpenter | 60/202 |
| 4,033,524 | * 7/1977 | Brice et al. | 244/158 |
| 5,420,588 | * 5/1995 | Bushman | 342/2 |
| 5,669,583 | * 9/1997 | Roth | 244/205 |
| 5,797,563 | * 8/1998 | Blackburn et al. | 244/205 |

FOREIGN PATENT DOCUMENTS

2244252  * 11/1991 (GB).

* cited by examiner

Primary Examiner—J. Woodrow Eldred
(74) Attorney, Agent, or Firm—Eric P. Schellin

(57) ABSTRACT

Method and apparatus for impingement on the sonic wave produced by a supersonic gas flow and the gas flow in a boundary layer of a gas that interfaces with a solid substrate comprising providing a source of a mixture of ions and electrons, introducing said ions and electrons into the region behind the sonic wave and ahead of the boundary layer, separating said ions and said electrons in said region maintaining a substantial portion of said ions proximate said region and maintaining a substantial portion of said electrons remote from said region.

16 Claims, 3 Drawing Sheets

ION DOPING APPARATUS AND METHOD FOR AERODYNAMIC FLOW CONTROL

1. FIELD OF THE INVENTION

The present invention relates to a method and apparatus for reducing aerodynamic drag and the intensity of the shock waves produced by aerodynamic members for example the wings of aircraft.

It is also taught herein that such method and apparatus may be employed on the leading edges of devices and projectiles emanating from cannon and the like and the nose cone of rockets.

When an aircraft is moving through the air at a speed exceeding the speed of sound, sonic (or shock) waves build up at the leading edges of the wing and other aerodynamic surfaces of the aircraft producing a phenomenon known as "sonic boom". This is objectionable not only because of resulting shock effects producing objectionable noise and doing physical damage to structures on the ground, but also because it results in an aerodynamic drag effect which retards the speed of the aircraft and requires more power to propel it through the air.

It is the object of the present invention to provide a method and apparatus for reducing shock waves and aerodynamic drag in an effective yet simple and economical manner.

A number of prior art thinkers have attempted to solve the problem of mitigating the effects of the shock wave at the leading edge in a fluid flow environment. For instance, in U.S. Pat. No. 3,162,398 to Clause et al the patentees employ a magnetohydrodynamic system for producing electrical currents within a moving air mass to control the position of a sonic wave relative to a flight vehicle.

It is well known that the total friction to movement of a body through a gas for a given Reynolds number depends largely upon the aerodynamic design of the particular body concerned. On an airfoil, for example, the optimum design is such as to delay the transition from laminar to turbulent air flow along the surface as much as possible as the speed of the airfoil increases. At moderate speeds, it has been possible to eliminate substantially all turbulent flow by proper design; at relatively higher speeds, however turbulent flow invariably results, with the attendant disadvantage of a sudden increase in the drag and decrease in the lift.

Much of the difficulty at high speeds is a direct result of frictional heating of the airfoil surfaces. This heating causes discontinuities in the layer of air immediately adjacent the hot airfoil surfaces, known as the boundary layer. These discontinuities in the boundary layer upset the normal path of the streamlines characterizing laminar flow. Thus, even with optimum present day aerodynamic designs, it has been difficult if not impossible to eliminate all turbulent flow and thereby reduce friction and attendant high heating at extremely high speeds.

Therefore, it is another object of the present invention to provide a novel method and apparatus for reducing the density of the air in the boundary layer whereby much higher Reynolds numbers may be realized without turbulent flow.

2. DESCRIPTION OF THE PRIOR ART

In patent U.S. Pat. No. 3,392,941 to Cason III, the patentee teaches the use of magnetohydrodynamic effects to achieve ionization of gases about a reentry nose cone thereby causing the ionization to provide an electromagnet to react with the ionized gases.

U.S. Pat. No. 3,360,220 to Meyer is also to a magnetohydrodynamic method and apparatus wherein a magnetic field is impressed upon an electrically conductive fluid medium to alter the flow pattern of the fluid.

In U.S. Pat. No. 3,446,464 to Donald, the patentee applies an electric field to the air in the vicinity of a leading edge air frame. For this purpose, electrodes are provided adjacent to the leading edge and a difference of potential is applied to the electrodes to establish an electric field between them.

U.S. Pat. No. 5,669,583 to Roth discloses a method and apparatus for covering an aircraft with a uniform glow discharge plasma which is said to affect the aerodynamic properties. It is stated that plasma is a partially ionized gas composed of ions, electrons and neutral species. It is produced by the action of either very high temperatures, or strong direct current or radio frequency electric fields.

U.S. Pat. No. 3,713,157 to August discloses the use of radiostotopes that produce ions that are injected into an air stream detailed to reduce a radar signature.

The prior art has not yet achieved the capability to provide acceptable drag reduction in a very efficient, practical and easily implemented fashion.

SUMMARY OF THE INVENTION

This invention is directed to an apparatus and method for modifying and controlling an air (or other gas) flow by selectively doping portions of the flow with ions. It is known that the performance of a high speed air or ground vehicle or engine is largely determined by the air flow around the vehicle and through its engine(s). This air flow is usually determined by the geometry of the vehicle, the shape and location of its control surfaces, the design of the flow path, engine, inlets, and nozzles. Depending on the desired speed and performance, a variety of different aerodynamic shapes, control surface designs, engine geometries, subsonic and supersonic flow paths, inlet and nozzle geometries, and thrust vectoring systems have been developed. These geometric techniques are, however, limited by the physical properties of the air such as its pressure, density, temperature, and velocity; and the size, mass and collision characteristics of its molecules. It would therefore be highly desirable to develop an apparatus and method to further enhance and control the air flow around the aircraft and through its engine(s) by modifying the physical properties of the air.

An apparatus according to this invention modifies the physical properties of the air by selectively doping the air flow ahead of an aerodynamic member with ions. The repulsive Coulomb forces between the ions in the doped region add to the normal kinetic forces between the air molecules in the doped region; facilitating and/or controlling the air flow, and modifying the sonic waves around the aircraft and its control surfaces, and through its flow path, engine(s), inlets, and nozzles.

For supersonic flows, doping the region between an aerodynamic member and the sonic wave produced by the supersonic flow ahead of the aerodynamic member with ions, reduces the intensity of the sonic wave. This reduces the pressure and density of the air in the region between the sonic wave and the aerodynamic member, which reduces the pressure against the front of the aerodynamic member and the density of the air in the boundary layer along the surface of the aerodynamic member, reducing both pressure and friction drag on the aerodynamic member.

For subsonic flows, doping the region ahead of an aerodynamic member reduces the density of the air in the boundary layer along the surface of the aerodynamic member, reducing the friction drag on the aerodynamic member.

In both cases drag reduction is achieved by modifying the properties of the air ahead of the aerodynamic member without employing electric or magnetic fields to change the velocity or direction of the air flow. As such, the energy required by our method and apparatus to reduce the drag on an aerodynamic member is minimized.

An apparatus to implement the drag reduction system is composed of an ion source and a mechanism for controlling the location of the ions ahead of the aerodynamic member. The mechanism for controlling the location of the ions ahead of the aerodynamic member may employ electric and/or magnetic fields to apply a force to the positively charged ions, and/or a gas flow to move the ions to the desired location.

Since ions are normally produced by removing one or more electrons from a neutral molecule, the ion source is normally composed of a plasma source which produces a gas of ions and electrons from neutral molecules, combined with a mechanism for extracting the ions from the electrons. The plasma source may take the form of an electric discharge (DC, RF, microwave, laser, etc.) which partially ionizes the air, producing ions and electron from the air molecules. Alternatively, one can ionize some other material (such as an organic material with low ionization potential) and inject the resultant electrons and ions into a gas, or exploit natural ionization processes to generate the plasma.

The mechanism for extracting the ions from the electrons may employ electric or magnetic fields to apply forces in opposite directions to the positively charged ions and the negatively charged electrons, an energy source to selectively energize the electrons and cause them to diffuse away from the ions, and/or a gas flow to separate the larger ions from the smaller electrons. In the latter case the ions are carried along with the gas flow (because of their relatively large collision cross section with the gas molecules), while the electrons are minimally effected by the air flow (because of their relatively small collision cross section with the gas molecules). The mechanism for separating the ions from the electrons may also be combined with the mechanism for controlling the location of the ions ahead of the aerodynamic member.

In a preferred embodiment a plasma is produced by an erosive plasma jet which ionizes wax organic molecules and projects them into the region ahead of the aerodynamic member. In this preferred embodiment the ions are separated from the electrons and moved to a location ahead of the aerodynamic member by the natural air flow moving towards the aerodynamic member and an electric field produced by an anode ahead of the aerodynamic member and a cathode located on/or behind the aerodynamic member. Furthermore, a microwave source is used to heat the electrons to enhance the rate at which they diffuse away from the aerodynamic member.

In another embodiment the plasma is generated by an electric arc between an anode ahead of the aerodynamic member and a cathode on/or behind the aerodynamic member. In this embodiment the electric field between the anode and cathode and the natural air flow used to separate the ions from the electrons and control the location of the ion doping region, while a microwave source is used to heat the electrons to enhance their diffusion rate.

In another embodiment an artificial gas flow is used to facilitate the separation of the ions from the electrons and control their location.

DETAILED DESCRIPTION OF PREFERRED EMBODIMENTS

Figure 1:
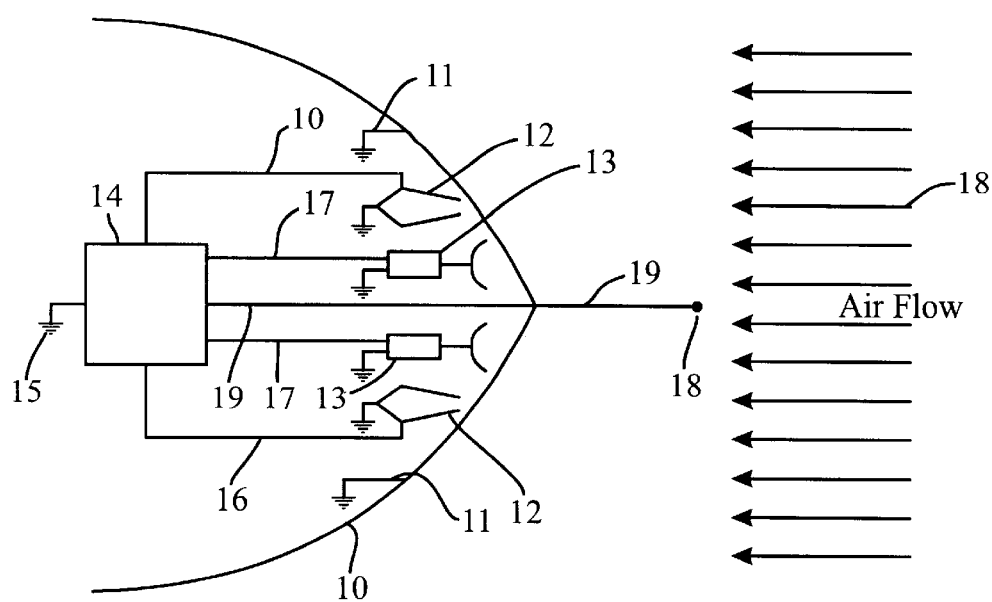
FIG. 1 depicts the fluid flow around an aircraft nose cone.

A typical embodiment of the invention, in a vehicle nose cone (or the nose of a body carried by a vehicle), where it can be used to reduce the aircraft drag, is illustrated in FIG. 1. The elements therein are shown schematically. Reference numeral 11 depict grounded cathodes, while reference numeral 12 depicts erosive plasma jets, and microwave generators or other electromagnetic sources and attendant antennas are shown in reference numerals 13. The devices are powered by a power source 14 which is grounded at 15. Medium voltage DC lines 16 power the erosive plasma jets 12. Low voltage DC lines 16 power the microwave source generators. A high voltage high impedance DC line 19 maintains the anode 18 in the incoming air flow at a high voltage. Although two erosive plasma jets 12 and microwave generators 13 are shown in the depicted two dimensional FIG. 1, multiple sources located about the nose cone are contemplated.

Figure 2:
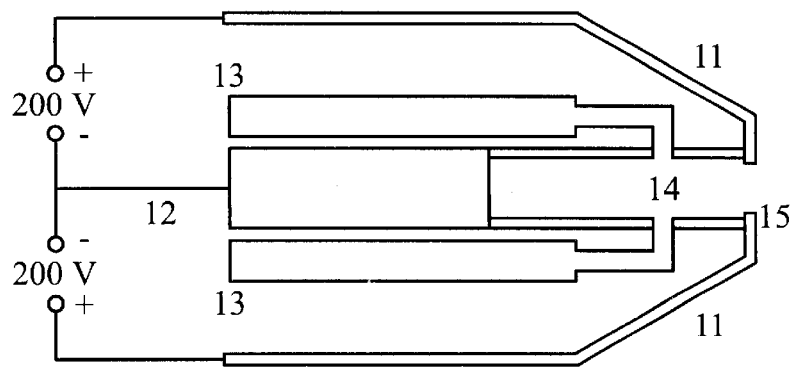
FIG. 2 depicts an erosive plasma jet.

In the embodiment plasma is generated by erosive plasma jets 12 which are depicted in FIG. 2. Working fluid, usually a paraffin or other organic fluid, is transferred from the reservoir 13 into the chamber 14. When a DC voltage on the order of a few hundred volts is applied between the anode 11 and cathode 12 of the erosive plasma jet, it ionizes the molecules in the working fluid in the chamber 14 producing a high pressure plasma in the chamber 14. The pressure in the chamber 14 forces the plasma through the nozzle 15 producing a plasma jet ahead of the nozzle, on the order of 10 cm in length.

Figure 3:
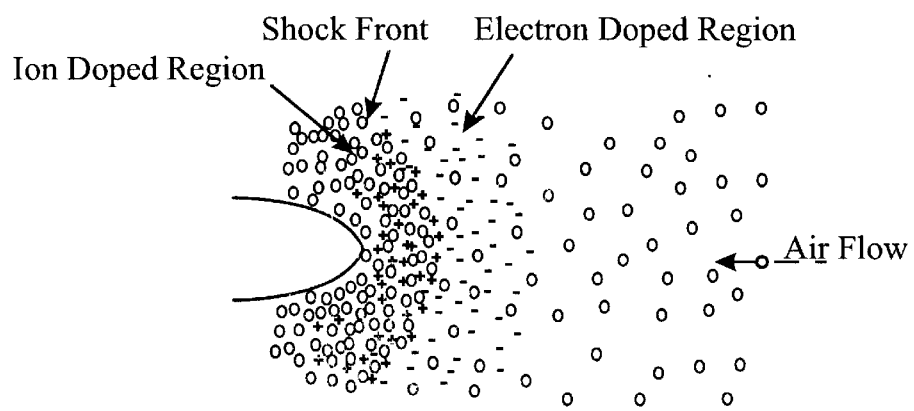
FIG. 3 depicts an electronic double layer formed ahead of a nose cone.

In this embodiment three mechanisms are provided to separate the ions from the electrons and position the ions ahead of the nose cone, various combinations of the separation mechanisms are used in other embodiments. First, the ions and electrons are separated mechanically by the natural air flow. The mechanical separation process is illustrated in FIG. 3. With their high collision cross section with the air molecules and low drift velocity, the ions are held near the surface of the nose cone by the air flow (behind the sonic wave for the case of a supersonic air flow), eventually flowing around the nose cone with the air flow. On the other hand, with their smaller collision cross section and higher drift velocity, the electrons diffuse forward away from the nose cone. This process produces ion and electron density distributions similar to those illustrated in FIG. 4. Here, the ions are near the nose cone, while the electrons are farther ahead of the nose cone and more widely diffused.

The separation process in this embodiment is enhanced by the electric field between the anode 18 ahead of the nose cone and the cathode 11 on/or behind the nose cone in FIG. 2. This electric field draws the negatively charged electrons away from the nose cone towards the anode 18 and the positively charged ions towards the cathode 11 on the nose cone. A high voltage, high impedance power supply 14 on the order of several thousand kilovolts is used to produce this electric field to maximize the strength of the electric field while minimizing the current flow through the anode 18, thereby minimizing the power required to generate the field.

The separation process in this embodiment is further enhanced by the microwave (or RF in another embodiment) sources 13 which are used to beam electromagnetic energy into the plasma. Since the air molecules are not electrically charged, the microwave energy is transferred to the ions and electrons with the bulk of the microwave energy going into the kinetic energy of the electrons since they are much lighter than the ions. This increases the drift velocity of the electrons in the air flow and facilitates their diffusion through the ambient air flow.

Figure 4:
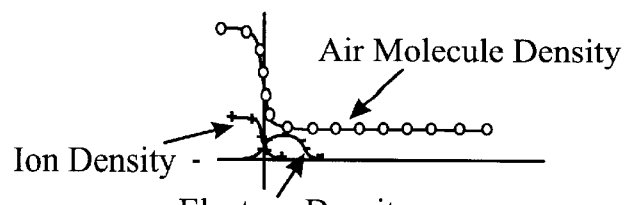
FIG. 4 depicts the density curves generated in the double layer as shown in FIG. 3.

The combination of these three separation mechanisms produces an ion doped (positive space charge) region near the nose cone and an electron doped (negative space charge) region ahead of the nose cone, as indicated in FIGS. 3 and 4. For a supersonic flow the ion doping is concentrated immediately behind the sonic wave with a sharpe discontinuity at the sonic wave, while the ion distribution produced by a subsonic flow is more diffuse.

Although the primary impact on the structure of the sonic wave is due to the repulsive forces between the ions in the region between the nose cone and the sonic wave, any residual electrons remaining ahead of the sonic wave will enhance this effect. The residual electrons ahead of the sonic wave will draw the ions behind the sonic wave closer to the sonic wave thereby increasing the Coulomb force produced by the ions at the sonic wave. Additionally, the residual electrons will produce an additional attractive Coulomb force on the ions at the sonic wave which will add to the repulsive Coulomb force due to the ion doping behind the sonic wave. Furthermore, an electric field will be generated between the positively charged ions behind the sonic wave and the residual negatively charged electrons ahead of the sonic wave. In the supersonic case, where the boundary between the ions behind the sonic wave and the electrons ahead of the sonic wave is sharpe this electric field is sufficiently intense to partially ionize the air molecules passing through the sonic wave, enhancing the plasma generated by the erosive plasma jet.

The primary effect of the ion doping in the region ahead of the nose cone (and behind the sonic wave for the case of a supersonic flow) is to reduce the aerodynamic drag on the nose cone. This drag reduction is caused by the repulsive Coulomb forces between the ions in the ion doped region, which increases the effective pressure in this region, modifying the characteristics of the air flow and the sonic wave (in the supersonic case). These Coulomb forces manifest themselves as an additional "body force" term in the momentum and energy equations characterizing the air flow. This results in the following modified set of governing equations for the air flow.

Continuity Equation: $-\int_S \rho u \cdot ds = \frac{\partial}{\partial t}\int_V \rho dV$ Momentum Equation:

$$\int_S (\rho u \cdot ds)u + \int_V \frac{\partial}{\partial t}(\rho u)dV = -\int_S p dS + \int_V \rho f dV$$

Energy Equation: $\int_V \dot{q}\rho dV - \int_S p u \cdot ds =$ $$\frac{\partial}{\partial t}\int_V \left[\rho\left(e + \frac{u^2}{2}\right)\right]dV + \int_S \rho\left(e + \frac{u^2}{2}\right)u \cdot ds - \int_V \rho(f \cdot u)dV$$

where the last term in the momentum and energy equation is the additional "body force" term. In these equations V denotes a control volume and S is its surface, while $\rho$ is the air density, p is the air pressure, u is the air velocity, q is the heat added to the air flow, and f represents the additional body forces on the control volume due to the ion doping.

From these equations the effective pressure impacting on the air flow, $p^e$, is the sum of the usual thermodynamic pressure $p^t$ e $pRT/\mu$ plus the additional Coulomb pressure, $p^q$, due to the repulsive forces between the ions in the doped region. Here, T is the air temperature and R and $\mu$ are the gas constants for air. Therefore $p^e = \rho RT/\mu + p^q$.

In a subsonic flow the effective pressure, $p^e$, and the temperature of the air in the region ahead of the nose cone are nearly constant. Thus, for the above equation to be satisfied, when the $p^q$ term produced by the ion doping in the region ahead of the nose cone is added to the equation, the air density, $\rho$, in this region must be reduced. This, in turn, reduces the air density in the boundary layer along the surface of the nose cone and the friction drag on the nose cone, since friction drag is a function of the air density in the boundary layer.

The situation in a supersonic air flow is somewhat more complex by virtue of the discontinuity in the air flow associated with the sonic wave ahead of the nose cone. This discontinuity is characterized by the Hugoniot equations which are obtained by applying the above continuity, momentum, and energy equations in a narrow region around the sonic wave. With the addition of the additional "body force" term which results from the ion doping in the region ahead of the nose cone and behind the sonic wave, these equations take the following form. $p_1 u_1 = p_2 u_2$ $p^1 + p_1(U_1)^2 = p_2 + p_2^q + p_2(u_2)^2$ $$\frac{P_1}{P_1} + e_1 + \frac{(u_1)^2}{2} = \frac{P_2 + P_2^q}{P_2} + e_2 \frac{(u_2)^2}{2}$$

where, the subscript "1" denotes the air flow parameters ahead of the sonic wave and the subscript "2" denotes the air flow parameters immediately behind the sonic wave. The Coulomb pressure term p2q behind the sonic wave is due to the ion doping in the region between the nose cone and the sonic wave.

As in the subsonic case the effect of the Coulomb pressure term p2q is to reduce the air density behind the sonic wave. In this case, however, it also reduces the temperature and the effective pressure behind the sonic wave while increasing the air velocity behind the sonic wave. As such, both the friction drag and the pressure drag on the nose cone are reduced. Moreover, the characteristics of the sonic wave are modified. Its intensity is reduced since the effective pressure and air density differential across the sonic wave is reduced, while the separation distance between the nose cone and the sonic wave is increased since the air velocity behind the sonic wave is increased.

Figure 5:
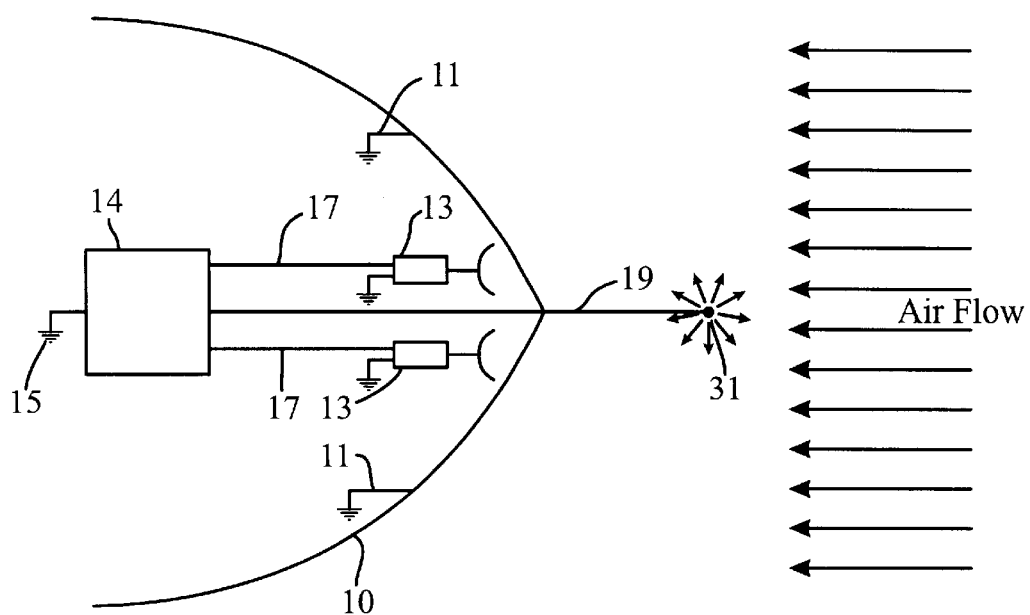
FIG. 5 depicts a second embodiment of fluid flow around an aircraft nose cone with a plasma arc.

Attention is directed to FIG. 5 for a second embodiment of the invention. The reference numerals identify the same elements as in the heretofore discussed Figures. In this embodiment, the erosive plasma sources are replaced by a plasma arc 31 at the anode 18. The operation of the system is essentially the same as that described heretofore. In this second embodiment, however, a high voltage low impedance power supply 32 is required to provide the current required to generate the plasma arc.

Figure 6:
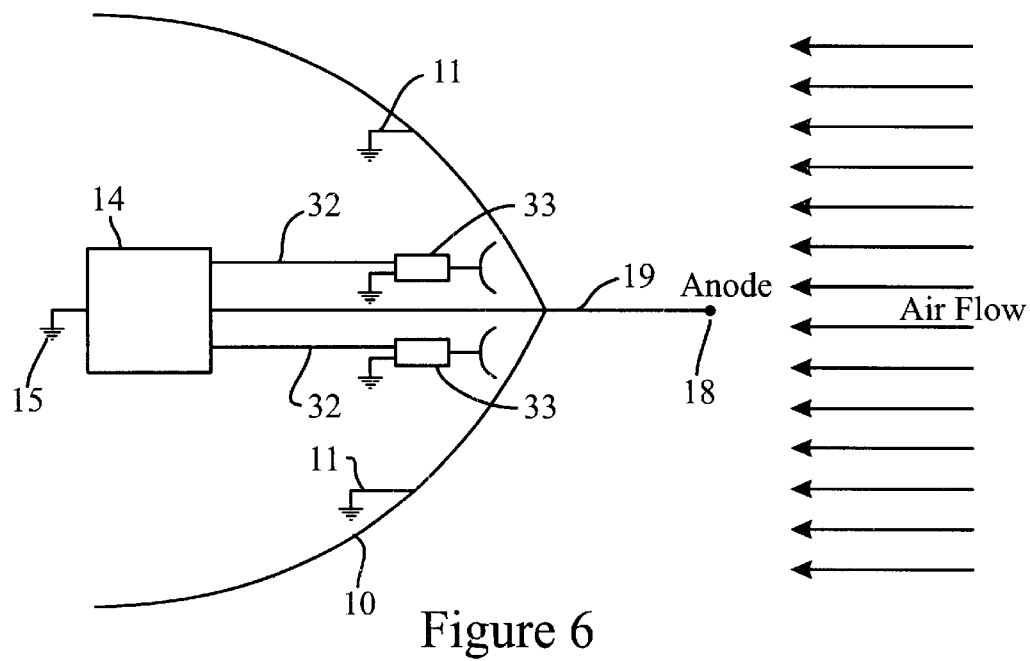
FIG. 6 depicts a third embodiment of fluid flow around an aircraft nose cone with a microwave source.

Attention is directed to FIG. 6, for a third embodiment of the invention. The reference numerals identify the same elements as in the heretofore discussed Figures. In this embodiment, a microwave heating system 33, through power lines 32 or, alternatively, an RF or a laser heating system, is used to generate the plasma by ionizing the air as well as heat the electrons.

Figure 7:
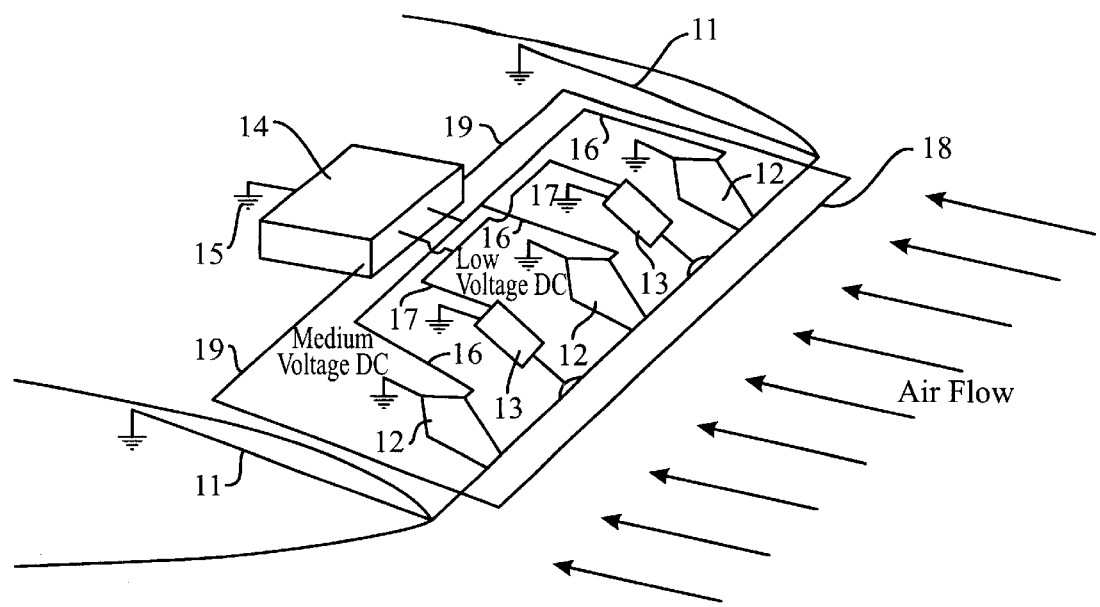
FIG. 7 depicts a fourth embodiment of fluid flow around the edges of an aircraft.

Attention is directed to FIG. 7 for a fourth embodiment of the invention. The reference numerals identify the same elements as in the heretofore discussed Figures. In this embodiment, it will be seen that the ion doping means is used on the leading edges of a vehicle, or its airfoils (wings, tail etc.), to reduce the strength of a bow wave, decreasing the drag on the vehicle surface. The FIG. 7 shows the FIG. 1 arrangement but it is adapted for use on a vehicle surface leading edge.

Figure 8:
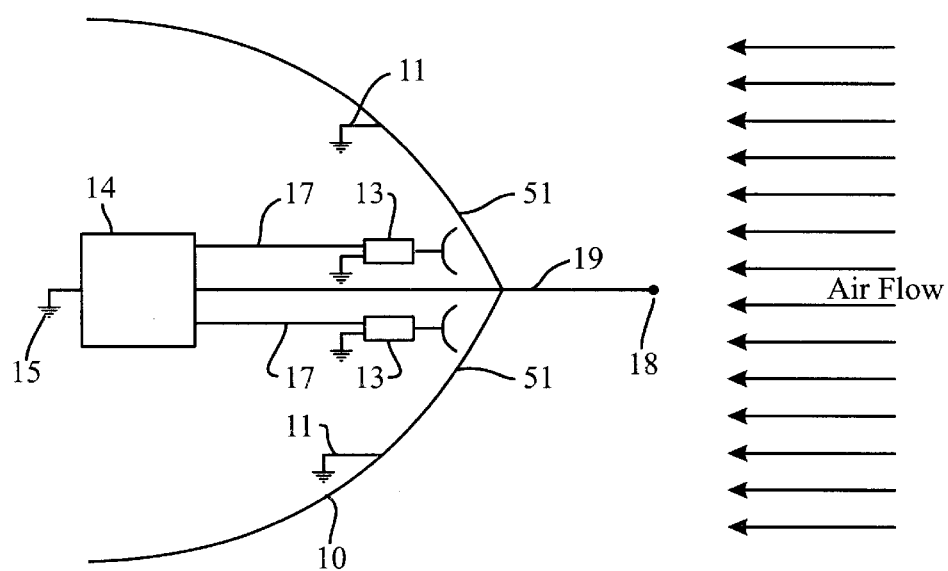
FIG. 8 depicts a fifth embodiment of fluid flow around an aircraft nose cone with enhanced air flow separation.

In any of the above described embodiments of the invention, a gas flow generated on-board the vehicle can be used in addition to or in lieu of the natural air flow to separate the ions and electrons produced by the plasma source and to control the location of the ion doping region. This is illustrated by FIG. 8, where air jets 51 are used to enhance the ion/electron separation process and to determine the location of the ion doped region.

In addition to using the apparatus for drag reduction on an aircraft nose cone or leading edge the same apparatus with appropriate changes to the implementation geometry can be used in a variety of alternative configurations to enhance or control the air flow around a flight or ground vehicle. Several applications of the ion doping apparatus to vehicles traveling at subsonic, supersonic, and hypersonic speeds are described below. In subsonic vehicles the apparatus can be used to directly control a subsonic flow and/or to control the local supersonic flows and sonic waves ofen associated with subsonic aircraft In addition, for supersonic and hypersonic aircraft the ion doping apparatus can be used to control and/or modify the sonic waves associated with the supersonic or hypersonic air flow around the aircraft which largely determines the performance of the aircraft.

The apparatus can be used to control an aircraft without moving surfaces (or to enhance the performance of moving surfaces) by ion doping asymmetric regions around the aircraft, i.e., one might dope a region above or below the wings of an aircraft (but not both), to generate a pitching movement. Similarly, one can dope the region around one wing, or on one side of a tail fin or the fuselage to produce rolling and yaw moments. In this application an embodiment of the apparatus similar to that of FIG. 7 would be employed with the ion doping apparatus located on the top or bottom (right or left, etc.) surface of the air foil to produce an asymmetric effect, thereby generating a moment which can be used to control the aircraft. Alternatively, one could install the apparatus on both sides of the wing or air foil, selecting either the apparatus above or below (right or left, etc.) the surface to control the direction of the resultant moment.

In typical fixed wing high lift device the front and rear flaps on the main airfoil significantly increase the lift associated with such a wing. The slots between the flaps and the main airfoil are to prevent. separation of the flow. The velocity of the air flow through these slots is limited to the sonic wave limiting the amount of lift that can be produced. By using the ion doping apparatus of the present invention to eliminate or reduce the intensity of the sonic wave in the slots, the performance of a high lift wing can be improved.

The mass flow of air entering an engine induction system is generally limited by the sonic waves produced by the local supersonic air flows in the engine induction system. The apparatus can be used to ion dope the area in front of an engine air induction inlet to reduce or eliminate the formation of sonic waves in front of the inlet, at the throat, and internally to reduce losses in total pressure, thereby increasing the gross thrust of the engine. It may also allow higher throat velocity by raising the local speed of sound in the throat.

In a subsonic aircraft, when the engine inlets are operating at a high angle of incidence to the free stream flow, the air flow at the leading lip of the inlet can separate due to the local flow accelerating to sonic speeds. This effect can be alleviated by using the ion doping apparatus to selectively control the sonic wave around the leading lip of the inlet.

In a scramjet powered high speed aircraft two sonic waves are generated, a bow wave and an engine cowl wave. In this situation it is important that the two sonic waves do not intersect, which would cause a significant increase in leading edge heating. The location at which the bow wave hits the engine cowl, however, varies with the speed of the aircraft and, as such, a movable cowl flap is often employed to prevent the two sonic waves form intersecting. By using the ion doping apparatus to modify the bow wave the point at which the bow wave hits the engine cowl can be controlled in-flight without a cowl flap and its associated drag and weight.

The performance of an aircraft engine at supersonic speeds is significantly affected by the sonic waves produced by the air flow approaching the engine inlet and inside the engine. The ion doping apparatus can be used in the inlet and inside such an engine to control the location and structure of these sonic waves to enhance and control the performance of the engine. It can be used to soften sonic wave strengths in the air induction/compression portion of the engine, reduce Mach number in the compression section and increase the speed of combustion allowing the combustion section to be shortened, and to improve the expansion section (nozzle) to increase kinetic efficiency by energizing the flow and reducing the local Mach number.

The sonic waves produced at the tips of a propeller, a turbine, or at the tip of the advancing rotor in a rotary wing aircraft often limits the maximum speed at which these devices can operate. The ion doping apparatus can be used to eliminate or reduce the intensity the sonic wave produced at the tips of a propeller, a turbine, or at the tip of the advancing rotor in a rotary wing aircraft, increasing the performance of these devices and reducing the noise produced by these sonic waves.

Supercritical airfoils are designed to accelerate the air flow over the upper surface to supersonic speeds, which then causes a sonic wave to form at the point where the flow decelerates through Mach 1.0. The ion doping apparatus of the present invention can be used to delay, soften, or eliminate this sonic wave, enhancing the performance of the airfoil.

Small scale models are often used in a wind tunnel to evaluate the aerodynamic characteristics of an aircraft or aircraft component. To facilitate scaling the resultant data to a full sized aircraft, the air in the wind tunnel is often heated to increase the speed of sound in the wind tunnel. The same effect can be achieved at lower cost by doping the air in the wind tunnel with ions.

The wings used on race cars are designed to produce maximum downward force for traction in turns, but compromise the acceleration of the race car in the straightaway. The ion doping apparatus can be used to increase this force in turns and release this force in the straightaways to improve straightaway acceleration as well as traction in turns.

It will be appreciated that the invention may take forms others than those specifically described, and the scope of the invention is to be determined solely by the following claims.

What is claimed is:

1. Method for impingement on the sonic wave produced by a gas flow in a boundary layer of a gas that interfaces with a solid substrate comprising providing a source of ablative material as a source of electrons and ions, disassociating said ablative material to produce a mixture of ions and electrons in the region behind said sonic wave and ahead of the boundary layer, separating said ions and said electrons in said region, maintaining a substantial portion of said ions proximate said region, and maintaining a substantial portion of said electrons remote from said region.

2. Method for impingement on a sonic wave produced by a supersonic gas flow in a boundary layer of a gas that interfaces with a solid substrate comprising providing a source of ablative material as a source of electrons and ions, disassociating said ablative material to produce a mixture of ions and electrons in the region behind said sonic wave and ahead of the boundary layer, separating said ions and said electrons in said region maintaining a substantial portion of said ions proximate said region and maintaining a substantial portion of said electrons remote from said region.

3. Apparatus for impingement on the sonic wave produced by a gas flow in a boundary layer of a gas that interfaces with a solid substrate comprising an ablative material as a disassociative source of a mixture of ions and electrons, means to introduce said ions and electrons into a region behind a sonic wave and ahead of a boundary layer, means to separate said ions and said electrons in said region, means to maintain a substantial portion of said ions proximate said region and means to maintain a substantial portion of said electrons remote from said region.

4. Apparatus for impingement on the sonic wave producd by a supersonic gas flow in a boundary layer of a gas that interfaces with a solid substrate comprising an ablative material as a disassociative source of a mixture of ions and electrons, means to introudce said ions and electrons into a region behind a supersonic wave and ahead of a boundary layer, means to separate said ions and said electrons in said region, means to maintain a substantial portion of said ions proximate said region and means to maintain a substantial portion of said electrons remote from said region.

5. Apparatus for impingement on the supersonic wave produced by the supersonic gas flow in a boundary layer of a gas that interfaces with a solid substrate comprising a disassociative source of a mixture of ions and electrons, means to introduce said ions and electrons into the region beind the supersonic wave and ahead of the boundary layer electrically energizable cathode means on said substate electrically energizable anode means ahead of said boundary layer, said cathode means and said anode means comprising means to separate said ions and said electrons in said region and to maintain a substantial portion of said ions proximate said region and a substantial portion of said electrons remote from said region.

6. The method of claim 1 wherein the ablative material is an organic wax.

7. The apparatus of claim 3 wherein the ablative material is an organic wax.

8. The method of claim 2 wherein the solid substrate is a leading edge of a wing.

9. The method of claim 2 wherein the solid substrate is a leading edge of a propeller.

10. The method of claim 2 wherein the solid substrate is a leading edge of a flying projectile.

11. The method of claim 2 wherein the solid substrate is a leading edge of a leading edge of a jet engine.

12. The apparatus of claims 4 or 5 wherein the solid substrate is a leading edge of a wing.

13. The apparatus of claim 4 or 5 wherein the solid substrate is a leading edge of a propeller.

14. The apparatus of claims 4 or 5 wherein the solid substrate is a leading edge of a flying projectile.

15. The method of claim 2 wherein the separation of said ions and said electrons is by supplying energy in said region.

16. The apparatus of claims 4 or 5 wherein the means to separate said ions and said electrons is an energy source selected from the group consisting of a microwave generator, an RF generator and laser.

* * * * *